United States Patent
Brown et al.

(10) Patent No.: US 6,185,423 B1
(45) Date of Patent: Feb. 6, 2001

(54) METHOD AND APPARATUS FOR SELECTING A COMMUNICATION CHANNEL IN A COMMUNICATION NETWORK

(75) Inventors: John Richard Brown, Lynwood; Steve Oliver Elliott, Renton, both of WA (US)

(73) Assignee: 3Com Corporation, Santa Clara, CA (US)

( * ) Notice: Under 35 U.S.C. 154(b), the term of this patent shall be extended for 0 days.

(21) Appl. No.: 09/321,647

(22) Filed: May 28, 1999

(51) Int. Cl.[7] ............................. H04Q 7/32; H04Q 7/20
(52) U.S. Cl. ................. 455/434; 455/436; 455/450; 455/455; 455/464; 455/509; 455/513; 455/515; 455/516; 455/574
(58) Field of Search ................... 455/450, 451, 455/452, 455, 464, 434, 509, 507, 513, 515, 516, 4.1, 574, 561, 62

(56) References Cited

U.S. PATENT DOCUMENTS

| | | | |
|---|---|---|---|
| 5,471,671 | * | 11/1995 | Wang et al. .......................... 455/62 |
| 5,839,071 | * | 11/1998 | Johnson .............................. 455/456 |
| 5,867,766 | * | 2/1999 | Dinc et al. ............................ 455/62 |
| 5,901,357 | * | 4/1999 | D'Avello et al. .................... 455/452 |
| 6,052,595 | * | 4/2000 | Schellinger et al. ................ 455/450 |
| 6,052,596 | * | 4/2000 | Barnickel ............................. 455/62 |

* cited by examiner

*Primary Examiner*—Fan Tsang
*Assistant Examiner*—Simon Nguyen
(74) *Attorney, Agent, or Firm*—Wilson Sonsini Goodrich & Rosati

(57) ABSTRACT

A method and apparatus for reducing power consumption in a roaming portable communication device is described. Various embodiments include optimizing a channel acquisition scan, or pre-scan, and a background scan in order to delay the reaction to a suspected loss of coverage to prevent unnecessary roaming and the associated power consumption. A list of received signal strengths is generated for a number of possible channels. Only those channels with a received signal strength above a threshold level are retained. The received signal strength of the remaining possible channels is retested. The selected channel is determined from the remaining possible channels by comparing the received signal strength of the last channel used, the last channel attempted (if available), and a best channel having the highest received signal strength. In this manner, a method and apparatus of analyzing and organizing base station channel strengths for subsequent channel acquisitions based on the power consumption costs for acquisition of a new channel is provided.

24 Claims, 4 Drawing Sheets

METHOD AND APPARATUS FOR SELECTING A COMMUNICATION CHANNEL IN A COMMUNICATION NETWORK

BACKGROUND OF THE INVENTION

1. Field of the Invention

The invention relates to reducing power consumption in a portable communication device, and more particularly to a battery saving protocol for a portable computer or similar device.

2. Discussion of the Related Art

Portable radio modems and similar devices (e.g., pagers and cellular telephone modems) have become increasingly popular along with the portable computers and devices they support. Along with the popularity of the radio modems, the diversity of their uses has increased, and power consumption of the devices, although always important, has become increasingly critical to the popularity and utility of the devices.

The typical radio modem device (e.g., a pager using the BellSouth wireless data network and operating in accordance with the Mobitex Interface Specification (MIS), Revision 3A, September, 1994) includes a standby state or mode during which no messages are transmitted or received, and an operating state or mode during which communications between the portable radio modem and the base station are effectuated. Whenever the radio modem is to transmit a message it enters the operating state, awaits a frame signal transmitted by a base station and transmits to the base station in a slot that is chosen at random. The radio modem then stays in the operating state for a period of time to receive a message response from the base station. In keeping with the power consumption concerns, battery-saving protocols have evolved further dictating the operation of the portable radio modems in battery-saving modes.

The typical portable radio modem employs three different states of operation in a battery-saving mode: a standby state; a synchronized "on" state; and a quick-scanning state. In the standby state, only the time-keeping functions for synchronizing the radio modem to the base station are operational. In the background scanning state, a list of channels is scanned until a potential new base station is found.

In the operating state, the device scans channels under two conditions. If the device is currently synchronized with a given base station, it will periodically evaluate channels within a list specified by the network (current channel list) in order to facilitate a roam to a better base. If the device is not currently synchronized with a given base station, it will enter a quick-scanning state in order to find a base station to synchronize with—as quickly as possible. It is noted that roaming is the act of sending a packet to the network to indicate that the device has changed base stations. Roaming is not to be confused with the act of background scanning, as background scanning is the precursor to roaming.

In a typical network environment, transmission frames called sweep frames are transmitted periodically from the base. The sweep frames mark the start of a sweep cycle and contain network system parameters. As such, the sweep frames synchronize the radio modems with the network. A modem in battery-save mode synchronizes with a subtype 6 sweep frame (<SVP6>) broadcast by the network. The <SVP6> includes a traffic list and the timing parameters used in synchronization and message transactions for portable radio modems. The cyclical shift between the standby state and the operating state performed by portable radio modems is synchronized by the <SVP6> frames.

During the typical network operation, a radio modem accesses stored values of the current base and current system channels upon activation. If no current base has been stored, the radio modem immediately starts quick channel monitoring, using any system channel default lists. When a suitable base station is found, a roam/active signal is sent to the base station in order for the radio modem to identifying itself to the base station, and the portable radio modem then synchronizes with the <SVP6> frames of the selected base station. Once the radio modem enters the operating state, it remains there until it receives an <SVP6> frame containing a traffic list in which it is not included. If the radio modem has lost consecutive <SVP6> frames within a specified time, it stays in the operating state to resynchronize. If the radio modem has not succeeded in resynchronizing within a predetermined time, it begins quick scanning.

The roaming signal value, for the selected network channel, is typically derived by calculating an average value of the received signal strength (RSS) on the system channel during a specified time. While monitoring the current system channel when making the final decision before choosing a new base, the radio modem measures average received signal strength (RSS) during the reception of frame heads.

The roaming signal value of non-selected network channels is derived by calculating the average value of the received signal strength indicator (RSSI) during a predetermined number of periods. If the radio modem has lost consecutive <SVP6> frames within the time specified it stays in the operating state to resynchronize. If the radio modem has not succeeded in resynchronizing within the predetermined time it begins a quick-scanning sequence to acquire a channel. During the background scanning sequence if the modem finds a base with a roaming value higher than a good threshold base level, the radio modem will monitor that base exclusively for a network-defined period to monitor RSSI over frame heads. Following this period, if the roaming value acquired over frame heads is sufficient (good threshold), the device will initiate a roam to that base station—sending in a roam packet to the new base. Following successful transmission, the device will commence to operate and synchronize with the newly acquired base.

To complete the transfer of information back to the portable radio modem from a base station, down-link traffic to radio modems is indicated by a traffic list from the base station. When a radio modem receives a list containing one of its addresses, the radio modem remains in the operating state until transmission is completed or the process is interrupted due to a non-receipt of the <SVP6> frame. The radio modem once again will enter into its roaming sequence and attempt to reacquire a connection with a base station. Each change to a new channel requires the radio modem to expend power in order to transmit a signal to the base station, a signal required to re-identify the radio modem and indicate on which channel it is operating.

One disadvantage present in the typical battery saving modes and the corresponding network operations discussed herein is that the roaming sequence operations of the typical radio modem and the operations for acquisition of a new channel each expends a considerable amount of power. When a new channel is acquired or a new base station is acquired a transmission must be made, wherein a roam packet is sent to the selected base station to identify the radio modem to the base station. Needless changing of channels to acquire a slightly better signal so as to avoid dropped connections is not cost effective when weighed against the power consumption required to establish the connection. Consequently, there is a desire for an improved battery-saving protocol in portable radio modems and portable communication devices.

SUMMARY OF THE INVENTION

Accordingly, the invention is directed to a method and apparatus for reducing power consumption in a roaming portable communication device that substantially obviates one or more of the problems due to limitations and disadvantages of the related art.

An object of the invention is to provide a method and apparatus for suppression of channel and base station changes based on the power consumption costs of a change verses the probability that a connection will be dropped.

Another object of the invention is to control transmissions associated with roaming of a portable communication device to reduce power consumption and increase battery life.

Another object of the invention is to provide a portable communication device having a low power consumption data retrieval mode.

To achieve these and other advantages, and in accordance with the purpose of the invention, as embodied and broadly described, the method and apparatus for reducing power consumption in a roaming portable communication device includes a method of selecting a communication channel from a group of channels. The method includes accessing a first list of communication channels. A received signal strength of each channel in the first list is scanned and measured. A second list is formed including the channels of the first list having a received signal strength equal to or greater than a prespecified threshold. The received signal strength of each channel in the second list is then scanned and measured, and the second list is ordered accordingly. A channel is selected for communication by comparatively evaluating a last used channel, a last attempted channel, and a best channel according to the second received signal strength. The last attempted channel is a channel selected for communication over which communication is not established. The best channel is the channel having the highest received signal strength in the second list.

In another aspect, a method of prolonging battery life in a mobile communication terminal is provided. This method includes acquiring a signal including a list of communication channels, and selecting a communication channel for use from the list. The selection of the communication channel includes optimizing the list. The list is optimized by first eliminating channels with a received signal strength less than a first threshold. The remaining channels are organized according to the received signal strength, and a comparative evaluation is performed among a last used channel, a last attempted channel, and a best channel. Moreover, background scanning of channels is also performed. The background scan includes scanning channels having a received signal strength equal to or greater than a prespecified threshold. The background scan of a prospective channel may be extended by an additional cycle depending on the evaluated RSSI level, effectively reducing transmissions associated with roaming delaying the decision to roam.

In a further aspect, a portable device is provided that selects a communication channel from a group of channels. The device includes a processor coupled to a memory, a display, and a radio modem. The processor is capable of selecting a communication channel from a group of channels by receiving a first list of communication channels. A received signal strength of each channel in the first list is scanned and measured. A second list is formed including the channels of the first list having a received signal strength equal to or greater than a prespecified threshold. A received signal strength of each channel in the second list is scanned and measured, and the second list is ordered accordingly. A channel is selected for communication by comparatively evaluating a last used channel, a last attempted channel, and a best channel according to the corresponding received signal strengths. The last attempted channel is a channel selected for communication over which communication is not established. The best channel is the channel having the highest received signal strength in the second list.

In a further aspect, an apparatus is provided for communicating among a network of base stations, the apparatus including a processor coupled to a memory, a display, and a radio modem. The apparatus further includes a means for receiving a list of communication channels, and a means for scanning and measuring a received signal strength of each channel in the list. Furthermore, the apparatus includes a means for forming a second list including the channels of the first list with a received signal strength equal to or greater than a prespecified threshold. The apparatus also includes a means for scanning and measuring the received signal strength of each channel in the second list and ordering the second list accordingly. Moreover, the apparatus includes a means for selecting a channel for communication by comparatively evaluating a last used channel and a last attempted channel and a best channel according to corresponding received signal strengths. The last attempted channel is a channel selected for communication over which communication is not established. The best channel has the highest received signal strength in the second list.

The descriptions provided herein are exemplary and explanatory and are intended to provide examples of the claimed invention.

BRIEF DESCRIPTION OF THE DRAWINGS

The accompanying drawings illustrate embodiments of the invention. In the drawings.

DETAILED DESCRIPTION OF THE PREFERRED EMBODIMENTS

A method and apparatus for reducing power consumption in a roaming portable communication device is provided that comprises optimizing a channel acquisition scan, or pre-scan, and a background scan in order to delay reaction to a suspected loss of coverage. This delayed reaction reduces the number of transmissions associated with roaming, wherein power is saved and device battery life is increased. Some embodiments of the method and apparatus include acquiring signals comprising a list of communication channels, and selecting a communication channel for use from the list. Selection of the communication channel comprises optimizing the list by eliminating channels with a received signal strength less than a prespecified threshold and organizing the remaining channels according to received signal strength. A comparative evaluation is performed among a last used channel, a last attempted channel, and a best channel.

Along with the channel acquisition scan, background scanning of channels is performed. The background scan comprises scanning channels of a broadcast current channel list with a received signal strength equal to or greater than that of the selected channel plus at least one threshold signal strength. The background scan is conducted for a number of cycles determined by a magnitude of the threshold signal strength. In this manner, a method and apparatus of analyzing and organizing base station channel strengths for subsequent channel acquisitions based on the power consumption costs for acquisition of a new channel is provided.

Portable Communication Device

Figure 1:
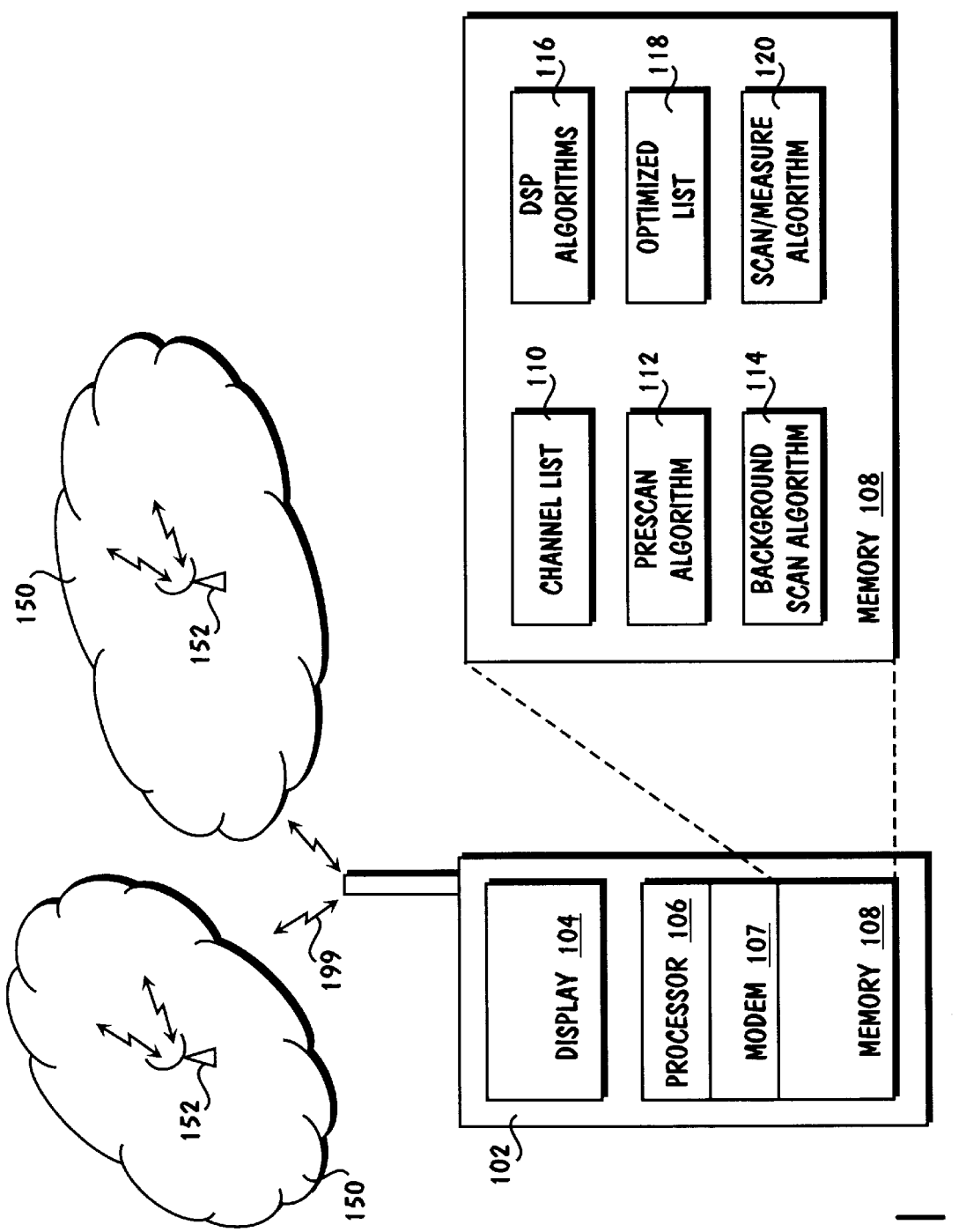
FIG. 1 is a portable communication device comprising an embodiment of the invention.

FIG. 1 is a portable communication device 102 comprising an embodiment of the invention. The portable communication device 102 may be selected from a group comprising hand-held computers, portable computers, portable position determination devices, portable electronic assistants, and cellular telephones, but is not so limited. In an embodiment, the portable communication device 102 roams and communicates among a network comprising base stations 152 and communication zones 150. Each communication zone 150 may be defined relative to at least one base station 152, but is not so limited. The communication zones 150 comprise cells of digital and analog cellular networks and pager networks, but are not so limited. In an embodiment, the portable communication device 102 is wireless and communicates among base stations 152 of the communication zones 150 using frequency modulation (FM) radio signals along with Gaussian minimum shift keying (GMSK) modulation techniques. Information 199 is communicated among the base stations 152 and the portable communication device 102 comprising, but not limited to, data, telephone calls, position information, and facsimile information.

The portable communication device 102 of an embodiment comprises at least one processor 106 coupled to at least one memory 108, at least one radio modem 107, and a display 104. One embodiment may have the portable communication device 102 and the modem 107 controlled by the same processor 106. An alternate embodiment may have separate processors for the portable communication device 102 and the modem 107. Another alternate embodiment may have the processor of the modem 107 controlling the portable communication device 102. The memory 108 comprises segments of memory 110–120 allocated for channel lists 110, digital signal processing (DSP) algorithms 116, and optimized channel lists 118, as well as memory locations allocated for pre-scan algorithms 112, background scan algorithms 114, and scan and measure algorithms 120. It is noted that memory 108 may comprise different types of memory, and that the segments of memory 110–120 may be located in different memory modules or co-located with other processors. Examples of communication device 102 include hand-held organizers from Palm Computing, Incorporated and devices using Windows CE.

In the performance of channel acquisition scanning, or pre-scanning, the processor 106 can select a communication channel from a group of channels by receiving a list of communication channels. In an embodiment, the received list comprises available channels of the communication network in which the portable communication device is operating. The received list can be a broadcast current channel list (up to 32 channels), a temporary default list if one exists (up to 64 channels), or a network default list of all communication frequencies used in the particular network (up to 200 channels). The channel list is received during a subtype 3 sweep <SVP3> frame, a sweep frame comprising the values of network system parameters for portable radio modems in a battery saving mode, but is not so limited. A received signal strength is received for each channel in the received list. While the received signal strength may be received using network data packet headers over the network frame heads, RSSI is acquired without respect to frame heads during quick-scanning and the preliminary background scan before one channel is selected as a candidate for roam.

The received signal strength of each channel in the received list is scanned and measured using the DSPs of the portable communication device, and a second list is formed including the channels of the received list having the first received signal strength equal to or greater than a first threshold signal strength. The second list of an embodiment comprises 32 channels, but is not so limited. The first threshold signal strength of an embodiment is a network GOOD_BASE threshold, but is not so limited. A second received signal strength of each channel in the second list is scanned and measured, and the second list is ordered in response to the second received signal strength. In an embodiment, the second received signal strength is scanned and measured one time. The ordering comprises ordering the channels of the second list in descending order based on received signal strength, wherein the channel in the first position of the channel list has the highest received signal strength. A channel is selected for communication by comparatively evaluating a last used channel, a last attempted channel, and a best channel according to the second received signal strength. The last attempted channel is a channel selected for communication over which communication is not established. The best channel is the channel having the highest received signal strength in the second list.

The comparative evaluation comprises determining whether the last used channel is in the second list. The processor selects the last used channel as the channel to be used for communication when the last used channel is determined to be the best channel in the second list, a determination based on the channel having the highest received signal strength of the channels of the second list. A first new channel is selected for communication, however, when the processor determines that the received signal strength of the first new channel exceeds the received signal strength of the last used channel by a second threshold signal strength. The second threshold signal strength of an embodiment is 6 decibels (dB), but is not so limited.

When the processor determines that the last used channel is absent from the second list, the processor selects the last attempted channel for communication when the last attempted channel is in a first position of the second list and the last attempted channel has a received signal strength that is greater than or equal to 3 dB above the next highest received signal strength on the second list. When the signal strength of the channel with the next highest received signal strength is within 3 dB of the received signal strength of the last attempted channel, the channel having the next highest received signal strength is moved into the first position of the second list and selected as the communication channel to be used by the portable communication device. In this manner, the channel acquisition scan, or pre-scan, is optimized by selecting a channel of similar signal strength over a last attempted channel over which communication failed.

In addition to the channel acquisition scan, or pre-scan, the portable communication device of an embodiment performs optimized background scanning. Background scanning comprises evaluating other network channels at specified intervals relative to the received signal strength of the selected channel in order to determine if a channel is available for communication having a sustained higher received signal strength than the selected channel. The background scan or evaluation is initiated upon receipt of a <SVP6> frame during a sweep cycle. The background scan or evaluation is performed by scanning and measuring the channels of the broadcast current channel list. Communication channels of the broadcast current channel list having a received signal strength equal to or greater than the received signal strength of the selected channel plus 12 dB are monitored for one sweep cycle. Communication channels of the broadcast current channel list having a received signal strength equal to or greater than the received signal strength of the selected channel plus a BETTER_BASE threshold are monitored for two sweep cycles. In this manner, the background scan is optimized with a resultant holdoff of an unnecessary transmission of a roam packet by delaying the reaction time to a suspected loss of communication signal coverage.

The portable communication device of an embodiment abandons a selected channel for lost synchronization if no sweep flame signal is received within a period of time equal to approximately 3.5 times the length of a sweep cycle. Upon abandoning the selected channel, the portable communication device selects a new communication channel using the channel acquisition scan, or pre-scan, techniques discussed herein.

In an alternate embodiment, the background scan may be initiated upon expiration of a timer. This timer allows the portable communication device to conserve power by staying powered down between background scan intervals while avoiding a missed opportunity to perform a background scan. The timer is activated upon completion of a <SVP6> frame and is set to power up in time to detect a subsequent <SVP6> frame signal and initiate a background scan. In the absence of the subsequent <SVP6> frame signal, the timer initiates a background scan during the projected time of the subsequent <SVP6> frame. If a sweep frame signal is received, the timer is cleared and the following background scan is initiated in response to the associated sweep frame signal.

Selecting Communication Channels

Figure 2:
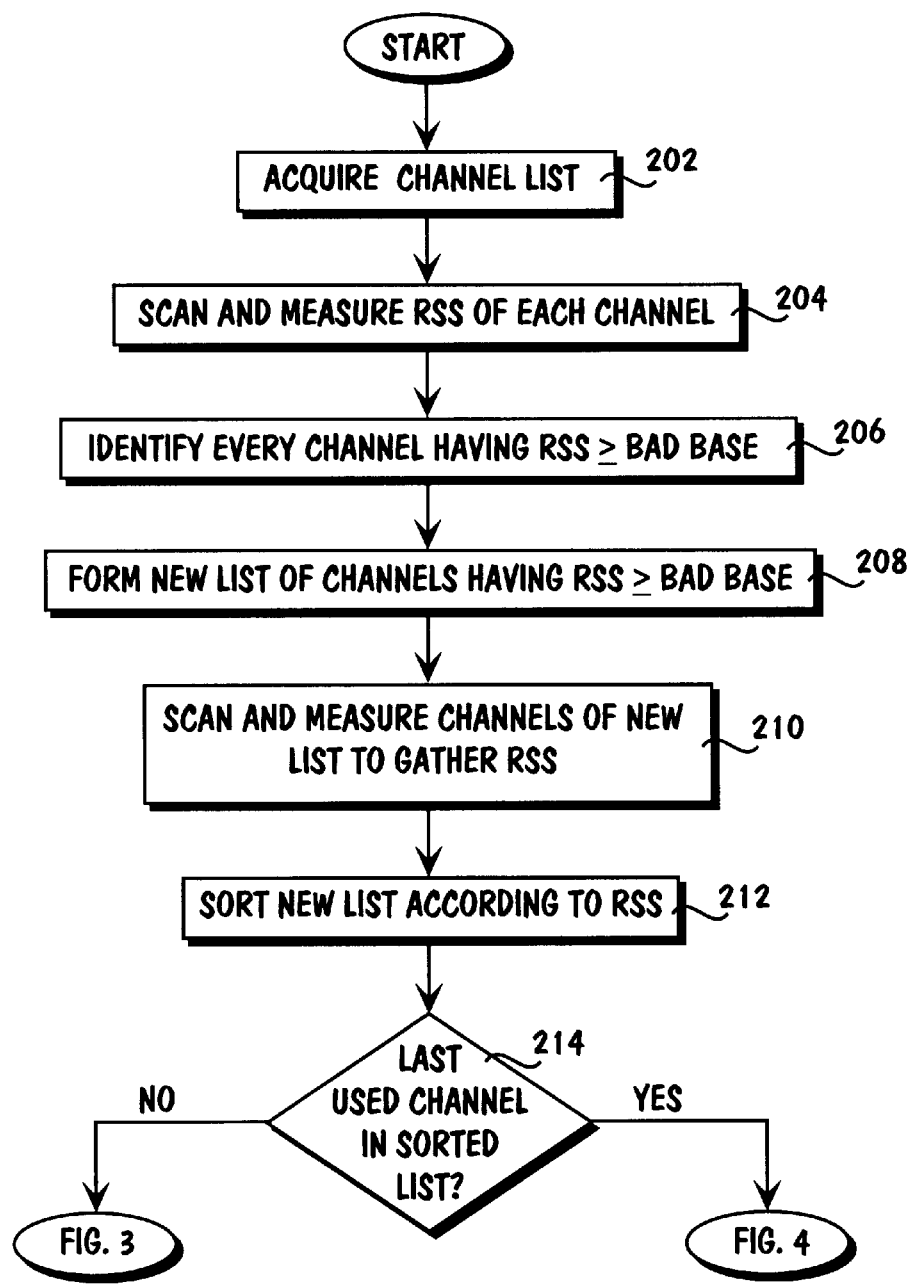
FIG. 2 is a flowchart for a method of selecting a communication channel of an embodiment of the invention.

FIG. 2 is a flowchart for a method of selecting a communication channel of an embodiment of the invention. Operation begins at step 202, at which a first channel list is acquired and accessed comprising a number of communication channels. A first received signal strength of each channel in the first list is scanned and measured, at step 204. At step 206, every channel in the first list having a received signal strength greater than or equal to a first threshold signal strength is identified. A second list is formed, at step 208, comprising the identified channels of the first list having the first received signal strength equal to or greater than the first threshold signal strength. A second received signal strength of each channel in the second list is scanned and measured, at step 210, and the second list is ordered in response to the second received signal strength, at step 212. In an embodiment, the second received signal strength is scanned and measured one time. A determination is made, at step 214 whether the last used channel is in the second list. If the last used channel is determined to be absent from the second list, operation continues in the flowchart of FIG. 3. If the last used channel is determined to be in the second list, operation continues in the flowchart of FIG. 4.

Figure 3:
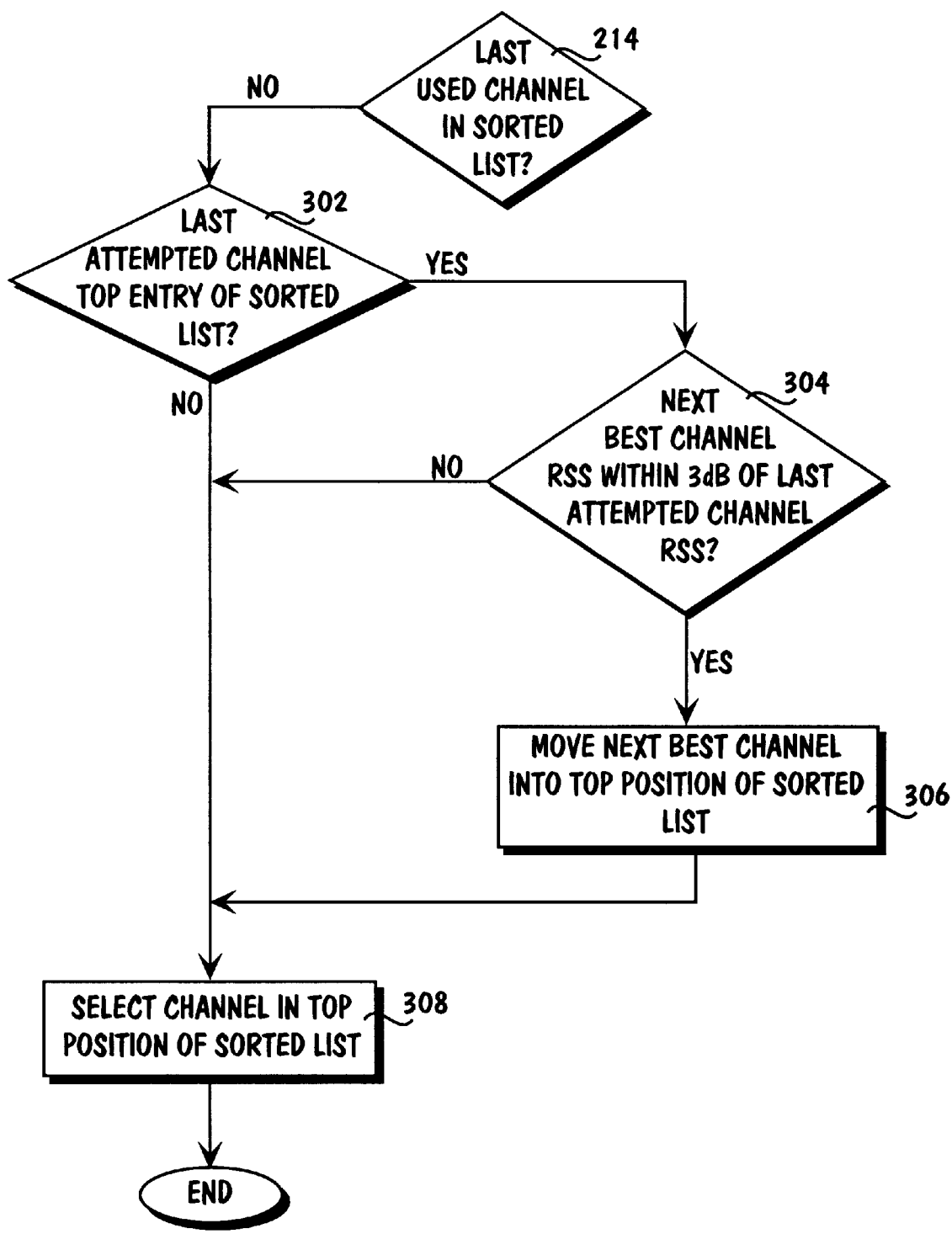
FIG. 3 is a continuation of the flowchart of FIG. 2.

FIG. 3 is a continuation of the flowchart for a method of selecting a communication channel of an embodiment of the invention when the last used channel is determined to be absent from the second list. At step 214, the last used channel is determined to be absent from the second list. Operation continues at step 302, at which a determination is made whether the last attempted channel is in the first position of the second list. The last attempted channel is the channel selected for communication over which communication was not established. When the last attempted channel is not in the first position of the second list, the channel in the first position is selected for communication, at step 308.

When the last attempted channel is in the first position of the second list, then a determination is made, at step 304, whether the received signal strength of the last attempted channel is greater than or equal to 3 dB above the next highest received signal strength on the second list. When the received signal strength of the last attempted channel is greater than or equal to 3 dB above the next highest received signal strength on the second list, the channel in the first position of the second list, the last attempted channel, is selected for communication, at step 308. When the received signal strength of the last attempted channel is less than 3 dB above the next highest received signal strength on the second list, the channel having the next highest received signal strength on the second list is moved into the first position of the second list, at step 306, and then selected for communication, at step 308.

Figure 4:
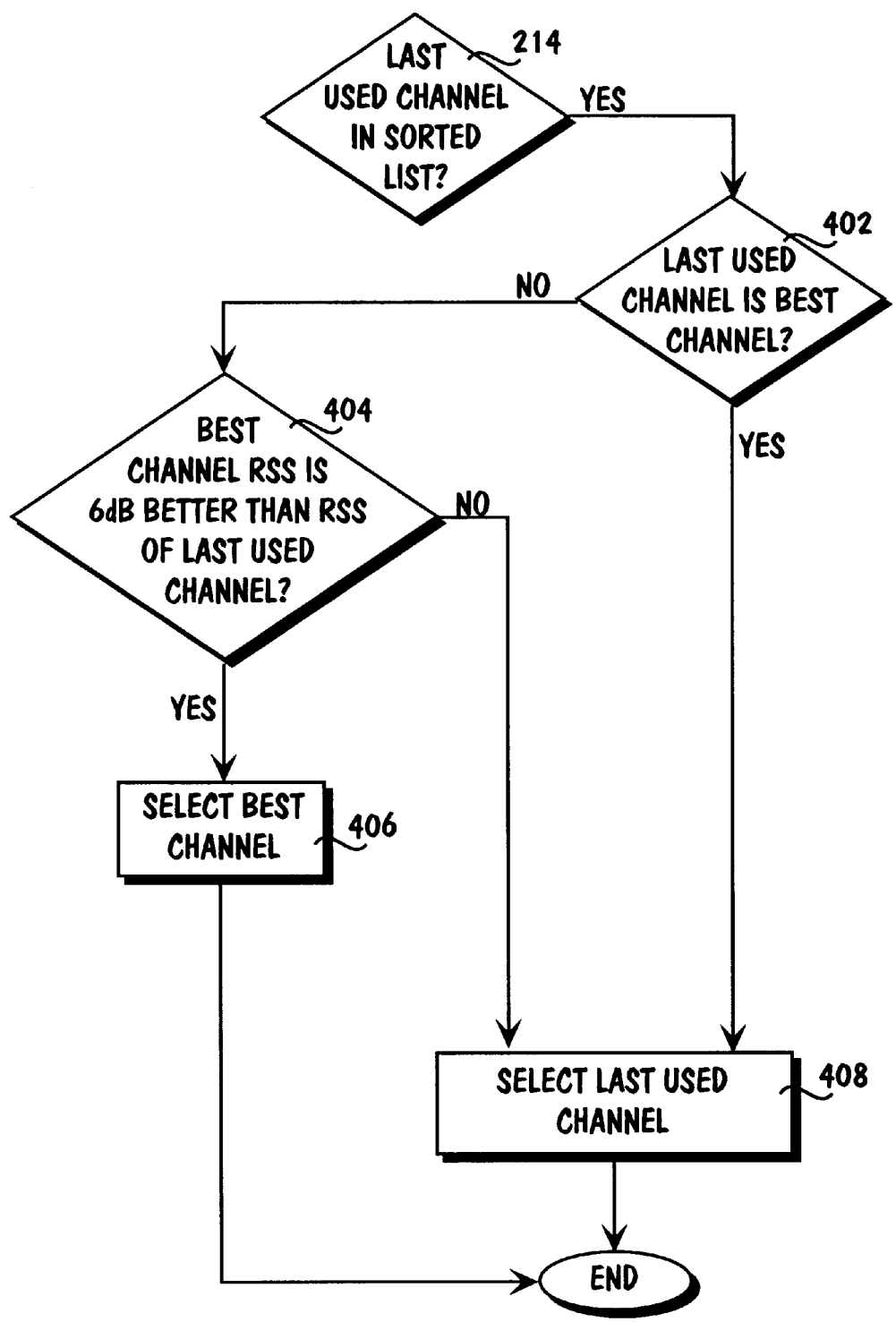
FIG. 4 is another continuation of the flowchart of FIG. 2.

FIG. 4 is another continuation of the flowchart for a method of selecting a communication channel of an embodiment of the invention when the last used channel is determined to be in the second list. At step 214, the last used channel is determined to be in the second list. Operation continues at step 402, at which a determination is made whether the last used channel is in the first position of the second list. When the last used channel is determined to be the best channel, the best channel having the highest received signal strength in the second list, then the last used channel is selected for communication at step 408. When the last used channel is not the best channel, a determination is made, at step 404, whether the received signal strength of the best channel is 6 dB better than the received signal strength of the last used channel. If the received signal strength of the best channel is determined to be 6 dB better than the received signal strength of the last used channel, the best channel is selected for communication, at step 406. If the received signal strength of the best channel is not 6 dB better than the received signal strength of the last used channel, the last used channel is selected for communication, at step 408.

In another aspect of the invention, a method of prolonging battery life in a mobile communication terminal is provided. This method comprises acquiring at least one signal comprising at least one list of communication channels, and selecting a communication channel for use from the list. The selection of the communication channel includes optimizing the list by eliminating channels having a received signal strength less than a first threshold and organizing the remaining channels according to the received signal strength and comparatively evaluating a last used channel, a last attempted channel, and a best channel. A background scan may also be performed. The background scan includes scanning channels having a received signal strength equal to or greater than the received signal strength of the selected channel plus at least one threshold signal strength. The background scan is conducted for a number of cycles determined by a magnitude of the threshold signal strength.

Furthermore, another aspect of the invention provides a computer readable medium containing executable instructions which, when executed in a processing system, causes the system to select a communication channel from a group of channels. The selection comprises accessing a first list comprising a number of communication channels. A first received signal strength of each channel in the first list is scanned and measured, and a second list is formed including the channels of the first list having the first received signal strength equal to or greater than a first threshold signal strength. A second received signal strength of each channel in the second list is scanned and measured, and the second list is ordered in response to the second received signal strength. A channel is selected for communication by comparatively evaluating a last used channel, a last attempted channel, and a best channel according to the second received signal strength. The last attempted channel is a channel selected for communication over which communication is not established, and the best channel is the channel having the highest received signal strength in the second list.

Moreover, another aspect of the invention provides an electromagnetic medium comprising executable instructions which, when executed in a processing system, causes the system to select a communication channel from a group of channels. The selection comprises accessing a first list comprising a number of communication channels. A first received signal strength of each channel in the first list is scanned and measured, and a second list is formed including the channels of the first list having the first received signal strength equal to or greater than a first threshold signal strength. A second received signal strength of each channel in the second list is scanned and measured, and the second list is ordered in response to the second received signal strength. A channel is selected for communication by comparatively evaluating a last used channel, a last attempted channel, and a best channel according to the second received signal strength. The last attempted channel is a channel selected for communication over which communication is not established, and the best channel is the channel having the highest received signal strength in the second list.

It will be apparent to those skilled in the art that various modifications and variations can be made in the method and apparatus for reducing power consumption in a roaming portable communication device of the invention without departing from the spirit or scope of the invention. Thus, it is intended that the invention cover the modifications and variations of this invention provided they come within the scope of the appended claims and their equivalents.

What is claimed is:

1. A method of selecting a communication channel from a group of communication channels using a communication device, comprising:
   accessing a first list comprising a plurality of communication channels;
   scanning and measuring a first received signal strength of each channel in the first list;
   forming a second list comprising the channels of the first list having the first received signal strength equal to or greater than a first threshold signal strength;
   scanning and measuring a second received signal strength of each channel in the second list;
   ordering the second list in response to the second received signal strength;
   selecting a communication channel by comparatively evaluating a last used channel, a last attempted channel and a best channel according to the corresponding second received signal strength, wherein the last attempted channel is a previously selected channel selected for communication but for which communication is not established, wherein the best channel has the highest received signal strength in the second list; and
   performing a background scan during at least one evaluation period, the background scan comprising scanning and measuring the channels of a currently used channel list, monitoring for one sweep cycle communication channels of the currently used channel list having a received signal strength equal to or greater than a received signal strength of the selected channel plus a fourth threshold signal strength, and monitoring for two sweep cycles communication channels of the currently used channel list having a received signal strength equal to or greater than the received signal strength of the selected channel plus a better base threshold signal strength.

2. The method of claim 1, wherein the selecting comprises:
   determining that the last used channel is in the second list;
   selecting the last used channel as the channel for communication when the last used channel is determined to be the best channel; and
   selecting a first new channel for communication when the first new channel has a received signal strength that exceeds the received signal strength of the last used channel by a second threshold signal strength.

3. The method of claim 1, wherein the selecting comprises:
   determining that the last used channel is absent from the second list;
   selecting the last attempted channel for communication when it is determined that the last attempted channel is in a first position of the second list;
   moving a second new channel into the first position of the second list when the second new channel has a received signal strength that exceeds the received signal strength of the last attempted channel by a third threshold signal strength; and
   selecting the channel in the first position in the second list.

4. A method of prolonging battery life in a mobile communication device, comprising:
   acquiring at least one signal comprising at least one list of communication channels;
   selecting a communication channel for use from the at least one list, wherein selecting comprises optimizing the at least one list by eliminating channels having a received signal strength less than a first threshold and organizing the remaining channels according to the received signal strength and comparatively evaluating a last used channel and a last attempted channel and a best channel;
   background scanning channels, wherein channels having a received signal strength equal to or greater than a received signal strength of the selected channel plus at least one threshold signal strength are background scanned for a number of cycles, the number of cycles determined by a magnitude of the at least one threshold; and
   selectively controlling changes by the mobile communication terminal among the communication channels using the optimized list.

5. The method of claim 4, wherein selecting a communication channel comprises:
   accessing a first list comprising a plurality of communication channels;
   scanning and measuring a first received signal strength of each channel in the first list;
   forming a second list comprising the channels of the first list having the first received signal strength equal to or greater than a first threshold signal strength;

scanning and measuring a second received signal strength of each channel in the second list;

ordering the second list in response to the second received signal strength; and selecting a channel for communication by comparatively evaluating a last used channel and a last attempted channel and a best channel according to the second received signal strength, wherein the last attempted channel is a channel selected for communication over which communication is not established, wherein the best channel has the highest received signal strength in the second list.

6. The method of claim 5, wherein selecting a communication channel comprises:

determining that the last used channel is in the second list;

selecting the last used channel as the channel for communication when the last used channel is determined to be the best channel; and selecting a first new channel for communication when the first new channel has a received signal strength that exceeds the received signal strength of the last used channel by a second threshold signal strength.

7. The method of claim 5, wherein selecting a communication channel comprises:

determining that the last used channel is absent from the second list;

selecting the last attempted channel for communication when it is determined that the last attempted channel is in a first position of the second list;

moving a second new channel into the first position of the second list when the second new channel has a received signal strength that exceeds the received signal strength of the last attempted channel by a third threshold signal strength; and selecting the second new channel for communication.

8. The method of claim 5, wherein background scanning channels comprises:

scanning and measuring the channels of a currently used channel list;

monitoring for one sweep cycle communication channels of the currently used channel list having a received signal strength equal to or greater than a received signal strength of the selected channel plus a fourth threshold signal strength; and monitoring for two sweep cycles communication channels of the currently used channel list having a received signal strength equal to or greater than the received signal strength of the selected channel plus a better base threshold signal strength.

9. A computer readable medium containing executable instructions which, when executed in a processing system, causes the system to select a communication channel from a group of channels, the selection comprising:

accessing a first list comprising a plurality of communication channels;

scanning and measuring a first received signal strength of each channel in the first list;

forming a second list comprising the channels of the first list having the first received signal strength equal to or greater than a first threshold signal strength;

scanning and measuring a second received signal strength of each channel in the second list;

ordering the second list in response to the second received signal strength;

selecting a channel for communication by comparatively evaluating a last used channel and a last attempted channel and a best channel according to the second received signal strength, wherein the last attempted channel is a channel selected for communication over which communication is not established, wherein the best channel has the highest received signal strength in the second list; and performing a background scan during at least one evaluation period, the background scan comprising scanning and measuring the channels of a currently used channel list, monitoring for one sweep cycle communication channels of the currently used channel list having a received signal strength equal to or greater than a received signal strength of the selected channel plus a fourth threshold signal strength, and monitoring for two sweep cycles communication channels of the currently used channel list having a received signal strength equal to or greater than the received signal strength of the selected channel plus a better base threshold signal strength.

10. The computer readable medium of claim 9, wherein selecting further comprises:

determining that the last used channel is in the second list;

selecting the last used channel as the channel for communication when the last used channel is determined to be the best channel; and selecting a first new channel for communication when the first new channel has a received signal strength that exceeds the received signal strength of the last used channel by a second threshold signal strength.

11. The computer readable medium of claim 9, wherein selecting further comprises:

determining that the last used channel is absent from the second list;

selecting the last attempted channel for communication when it is determined that the last attempted channel is in a first position of the second list;

moving a second new channel into the first position of the second list when the second new channel has a received signal strength that exceeds the received signal strength of the last attempted channel by a third threshold signal strength; and selecting the second new channel for communication.

12. A portable device that selects a communication channel from a group of channels, the device comprising at least one processor coupled to a memory, a display, and at least one radio modem, the at least one processor capable of selecting a communication channel from a group of channels by:

receiving a first list comprising a plurality of communication channels;

scanning and measuring a first received signal strength of each channel in the first list;

forming a second list comprising the channels of the first list having the first received signal strength equal to or greater than a first threshold signal strength;

scanning and measuring a second received signal strength of each channel in the second list;

ordering the second list in response to the second received signal strength;

selecting a channel for communication by comparatively evaluating a last used channel and a last attempted channel and a best channel according to the second received signal strength, wherein the last attempted channel is a channel selected for communication over which communication is not established, wherein the best channel has the highest received signal strength in the second list; and performing a background scan during at least one evaluation period by scanning and measuring the channels of a currently used channel list, monitoring for one sweep cycle communication channels of the currently used channel list having a received signal strength equal to or greater than a received signal strength of the selected channel plus a fourth threshold signal strength, and monitoring for two sweep cycles communication channels of the currently used channel list having a received signal strength equal to or greater than the received signal strength of the selected channel plus a better base threshold signal strength.

13. The portable device of claim 12, wherein the at least one processor is capable of selecting by:

determining that the last used channel is in the second list;

selecting the last used channel as the channel for communication when the last used channel is determined to be the best channel; and selecting a first new channel for communication when the first new channel has a received signal strength that exceeds the received signal strength of the last used channel by a second threshold signal strength.

14. The portable device of claimed, wherein the at least one processor is capable of selecting by:

determining that the last used channel is absent from the second list;

selecting the last attempted channel for communication when it is determined that the last attempted channel is in a first position of the second list;

moving a second new channel into the first position of the second list when the second new channel has a received signal strength that exceeds the received signal strength of the last attempted channel by a third threshold signal strength; and selecting the second new channel for communication.

15. The portable device of claim 12, wherein the portable device is selected from a group comprising hand-held computers, portable electronic assistants, and cellular telephones.

16. An apparatus for communicating among a network of base stations, the apparatus comprising at least one processor coupled to a memory, a display, and at least one radio modem, the apparatus further comprising:

means for receiving a first list comprising a plurality of communication channels;

means for scanning and measuring a first received signal strength of each channel in the first list;

means for forming a second list comprising the channels of the first list having the first received signal strength equal to or greater than a first threshold signal strength;

means for scanning and measuring a second received signal strength of each channel in the second list;

means for ordering the second list in response to the second received signal strength;

means for selecting a channel for communication by comparatively evaluating a last used channel and a last attempted channel and a best channel according to the second received signal strength, wherein the last attempted channel is a channel selected for communication over which communication is not established, wherein the best channel has the highest received signal strength in the second list; and means for performing a background scan during at least one evaluation period by scanning and measuring the channels of a currently used channel list, monitoring for one sweep cycle communication channels of the currently used channel list having a received signal strength equal to or greater than a received signal strength of the selected channel plus a third threshold signal strength, and monitoring for two sweep cycles communication channels of the currently used channel list having a received signal strength equal to or greater than the received signal strength of the selected channel plus a better base threshold signal strength.

17. The apparatus of claim 16, further comprising:

means for determining whether the last used channel is in the second list;

means for selecting the last used channel as the channel for communication when the last used channel is determined to be the best channel;

means for selecting a first new channel for communication when the first new channel has a received signal strength that exceeds the received signal strength of the last used channel by a second threshold signal strength;

means for selecting the last attempted channel for communication when it is determined that the last attempted channel is in a first position of the second list;

means for moving a second new channel into the first position of the second list when the second new channel has a received signal strength that exceeds the received signal strength of the last attempted channel by a third threshold signal strength; and means for selecting the second new channel for communication.

18. The apparatus of claim 16, wherein the apparatus communicates using frequency modulated signals along with Gaussian minimum shift keying modulation.

19. The apparatus of claim 16, wherein the apparatus is selected from a group comprising hand-held computers, portable electronic assistants, and cellular telephones.

20. An electromagnetic medium containing executable instructions which, when executed in a processing system, causes the system to select a communication channel from a group of channels, the selection comprising:

accessing a first list comprising a plurality of communication channels;

scanning and measuring a first received signal strength of each channel in the first list;

forming a second list comprising the channels of the first list having the first received signal strength equal to or greater than a first threshold signal strength;

scanning and measuring a second received signal strength of each channel in the second list;

ordering the second list in response to the second received signal strength;

selecting a channel for communication by comparatively evaluating a last used channel and a last attempted channel and a best channel according to the second received signal strength, wherein the last attempted channel is a channel selected for communication over which communication is not established, wherein the best channel has the highest received signal strength in the second list; and performing a background scan during at least one evaluation period, the background scan comprising scanning and measuring the channels of a currently used channel list, monitoring for one sweep cycle communication channels of the currently used channel list having a received signal strength equal to or greater than a received signal strength of the selected channel plus a second threshold signal strength, and monitoring for two sweep cycles communication channels of the currently used channel list having a received signal strength equal to or greater than the received signal strength of the selected channel plus a better base threshold signal strength.

21. A system comprising a plurality of base stations using a group of channels, the base stations communicating with at least one portable device that selects a communication channel from the group of channels, the portable device comprising at least one processor coupled to a memory, a display, and at least one radio modem, the at least one processor capable of selecting a communication channel from the group of channels by:

receiving a first list comprising a plurality of communication channels;

scanning and measuring a first received signal strength of each channel in the first list;

forming a second list comprising the channels of the first list having the first received signal strength equal to or greater than a first threshold signal strength;

scanning and measuring a second received signal strength of each channel in the second list;

ordering the second list in response to the second received signal strength;

selecting a channel for communication by comparatively evaluating a last used channel and a last attempted channel and a best channel according to the second received signal strength, wherein the last attempted channel is a channel selected for communication over which communication is not established, wherein the best channel has the highest received signal strength in the second list; and performing a background scan during at least one evaluation period by scanning and measuring the channels of a currently used channel list, monitoring for one sweep cycle communication channels of the currently used channel list having a received signal strength equal to or greater than a received signal strength of the selected channel plus a fourth threshold signal strength, and monitoring for two sweep cycles communication channels of the currently used channel list having a received signal strength equal to or greater than the received signal strength of the selected channel plus a better base threshold signal strength.

22. The system of claim 21, wherein the at least one processor is further capable of selecting by:

determining that the last used channel is in the second list;

selecting the last used channel as the channel for communication when the last used channel is determined to be the best channel; and selecting a first new channel for communication when the first new channel has a received signal strength that exceeds the received signal strength of the last used channel by a second threshold signal strength.

23. The system of claim 21, wherein the at least one processor is further capable of selecting by:

determining that the last used channel is absent from the second list;

selecting the last attempted channel for communication when it is determined that the last attempted channel is in a first position of the second list;

moving a second new channel into the first position of the second list when the second new channel has a received signal strength that exceeds the received signal strength of the last attempted channel by a third threshold signal strength; and selecting the second new channel for communication.

24. A method for reducing power consumption in a roaming portable communication device, comprising:

generating a list of received signal strengths for at least one possible channel;

identifying channels with a received signal strength above a threshold level;

resampling received signal strengths of the identified channels;

selecting a communication channel from the identified channels by comparing the received signal strength of a last used channel, an available last attempted channel, and a best channel having the highest resampled received signal strength of the identified channels; and performing a background scan during at least one evaluation period, the background scan comprising scanning and measuring channels of a currently used channel list, monitoring for one sweep cycle communication channels of the currently used channel list having a received signal strength equal to or greater than a received signal strength of the selected channel plus a first threshold signal strength, and monitoring for two sweep cycles communication channels of the currently used channel list having a received signal strength equal to or greater than the received signal strength of the selected channel plus a better base threshold signal strength.

* * * * *